(12) United States Patent
Karmazyn

(10) Patent No.: US 10,179,734 B2
(45) Date of Patent: Jan. 15, 2019

(54) FUEL SUPPLY APPARATUS

(71) Applicant: INTELLIGENT ENERGY LIMITED, Loughborough (GB)

(72) Inventor: Harry John Karmazyn, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 186 days.

(21) Appl. No.: 14/787,641

(22) PCT Filed: May 1, 2014

(86) PCT No.: PCT/GB2014/051360
§ 371 (c)(1),
(2) Date: Oct. 28, 2015

(87) PCT Pub. No.: WO2014/177879
PCT Pub. Date: Nov. 6, 2014

(65) Prior Publication Data
US 2016/0083250 A1 Mar. 24, 2016

(30) Foreign Application Priority Data
May 3, 2013 (GB) .................................. 1308038.7

(51) Int. Cl.
*H01M 8/065* (2016.01)
*C01B 3/06* (2006.01)

(52) U.S. Cl.
CPC .............. *C01B 3/065* (2013.01); *C01B 3/06* (2013.01); *Y02E 60/324* (2013.01); *Y02E 60/362* (2013.01)

(58) Field of Classification Search
CPC ....... H01M 8/04216; C01B 3/06; C01B 3/065

USPC .......... 429/421; 422/198, 199, 310; 423/657
See application file for complete search history.

(56) References Cited

U.S. PATENT DOCUMENTS

| 5,167,999 A | * | 12/1992 | Wang .................. A43B 7/1425 36/30 R |
| 6,534,033 B1 | | 3/2003 | Amendola et al. |
| 2002/0088178 A1 | | 7/2002 | Davis |
| 2004/0214056 A1 | * | 10/2004 | Gore ....................... C01B 3/065 429/421 |
| 2005/0142404 A1 | | 6/2005 | Boucher et al. |
| 2005/0266281 A1 | | 12/2005 | Adams et al. |

(Continued)

FOREIGN PATENT DOCUMENTS

| CN | 101243163 A | 8/2008 |
| EP | 1367025 | 12/2003 |
| SU | 1674975 A2 | 9/1991 |

OTHER PUBLICATIONS

Singapore Patent Application No. 11201508929Y; Written Opinion; dated Jul. 22, 2016; 6 pages.

(Continued)

*Primary Examiner* — Sean P Cullen
(74) *Attorney, Agent, or Firm* — Baker & Hostetler LLP

(57) ABSTRACT

A fuel supply apparatus comprising; a reaction chamber for hosting a reaction when a fuel generating fluid and a fuel generating substance are brought together to generate fuel, a plurality of discrete fuel generating fluid chambers, each chamber being separately rupturable; and, a heater assembly adapted to, when in use, selectively rupture the fuel generating fluid chambers to supply fuel generating fluid to the reaction chamber.

23 Claims, 3 Drawing Sheets

(56) References Cited

U.S. PATENT DOCUMENTS

| | | | |
|---|---|---|---|
| 2007/0081939 A1 | 4/2007 | Berry et al. | |
| 2007/0253875 A1* | 11/2007 | Koripella | H01M 8/04201 422/232 |
| 2009/0304558 A1 | 12/2009 | Patton et al. | |
| 2010/0247426 A1 | 9/2010 | Wallace et al. | |
| 2011/0177404 A1* | 7/2011 | Hung | H01M 8/04208 429/416 |
| 2015/0203353 A1* | 7/2015 | Fisher | C01B 3/04 422/164 |

OTHER PUBLICATIONS

International Search Report and Written Opinion dated Aug. 13, 2014 in International Application No. PCT/GB2014/051360.
Great Britain Patent Application No. 1308038.7; Search Report; dated Nov. 5, 2013; 3 pages.

* cited by examiner

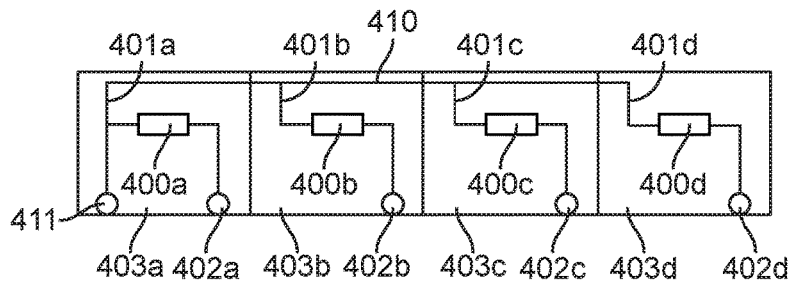

FIG. 4

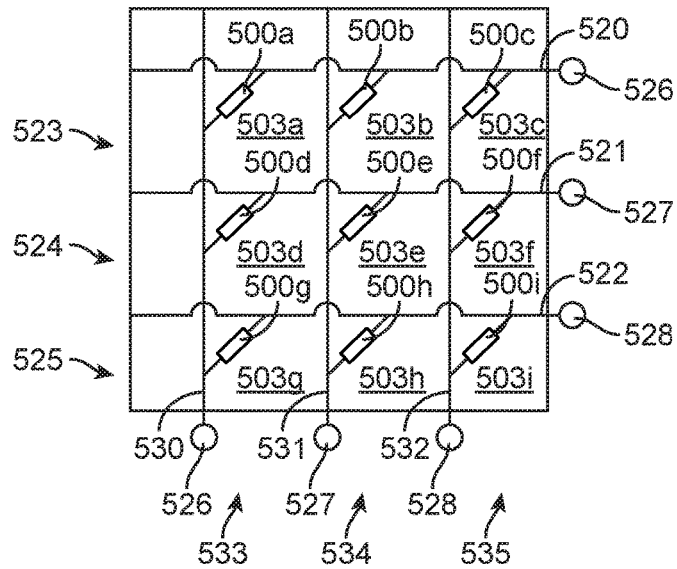

FIG. 5

| Providing a plurality of discrete fuel generating fluid chambers, each fluid chamber containing fluid and being separately rupturable | 601 |
| --- | --- |
| Providing a fuel generating subtance which, in combination with the fuel generating fluid, can generate a fuel | 602 |
| Rupturing at least one fluid chamber to transfer the fuel generating fluid to the fuel generating subtance for generating the fuel | 603 |

FIG. 6

FUEL SUPPLY APPARATUS

CROSS-REFERENCE TO RELATED APPLICATIONS

This application is a National Stage of International Patent Application No. PCT/GB2014/051360, filed May 1, 2014 and claims priority to foreign application GB 1308038.7, filed May 3, 2013, the contents of which are incorporated herein by reference in their entirety.

The present disclosure relates to a fuel supply apparatus. In particular, it relates to a hydrogen supply apparatus for an electrochemical fuel cell. The invention also relates to a fluid store for a fuel supply apparatus and a method of supplying a fuel.

A fuel supply apparatus is useful for supplying hydrogen as fuel to hydrogen-consuming devices such as electrochemical fuel cells, which use the hydrogen to generate electrical power. It is desirable to have a safe and controllable source of hydrogen.

A known type of fuel supply apparatus comprises a hydrogen gas supply apparatus that releases hydrogen on demand by the reaction of a reactant fuel material, such as a stabilized alkali metal material, contained within a reaction chamber, with an activation fluid of aqueous solution or water supplied from a water chamber. As activation fluid is fed into the reaction chamber, hydrogen gas is generated and can be draw off through an outlet for consumption by the fuel cell. It is common for said apparatus to include a pump and valves to control the flow of activation fluid into the reaction chamber.

It is important that the reaction within the fuel supply apparatus is easily controlled to ensure sufficient hydrogen is generated to meet demand. It is also important that the fuel supply apparatus is reliable and easy to manufacture.

In accordance with a first aspect of the invention there is provided a fuel supply apparatus comprising;
a reaction chamber for hosting a reaction when a fuel generating fluid and a fuel generating substance are brought together to generate fuel,
a plurality of discrete fuel generating fluid chambers, each chamber being separately rupturable; and,
a heater assembly adapted to, when in use, selectively rupture the fuel generating fluid chambers to supply the fuel generating fluid to the reaction chamber.

This is advantageous as the apparatus can activate the heater assembly to selectively rupture the fluid chambers to provide the fuel generating fluid to the reaction chamber.

Preferably, the fuel generating fluid comprises an activation fluid and the fuel generating substance comprises a fuel source. This is advantageous as the activation fluid and the fuel source can react together in the reaction chamber to generate fuel when the chambers are ruptured in use. Alternatively, the fuel generating fluid may comprise a fuel source fluid and the second fuel generating substance may comprise a catalyst for catalysing the fuel source fluid to generate fuel. This is advantageous as when the fuel generating fluid chambers are ruptured, the fuel source fluid can flow to meet the catalyst and generate fuel in the reaction chamber.

The heater assembly may comprise a plurality of heaters arranged such that each fuel generating fluid chamber is associated with at least one heater for heating, and thereby rupturing, said fuel generating fluid chamber.

The heaters may form part of the plurality of discrete fuel generating fluid chambers.

Alternatively, the heaters may be formed on part of the fuel supply apparatus and arranged adjacent the plurality of discrete fuel generating fluid chambers and configured such that they can be selectively activated. The fuel generating fluid chambers may each be associated with at least one heater.

The discrete fuel generating fluid chambers may comprise a plurality of sealed bladders. The bladders may be formed in a sheet, each bladder containing fuel generating fluid and being separately rupturable. In particular, the sheet may be of at least two film layers, the layers sealed together at localised portions to define the plurality of bladders.

The heater assembly may be printed onto the film sheet.

The heater assembly may include power receiving terminals for electrically connecting to the fuel supply apparatus for receiving power therefrom.

The heater assembly may also be configured to heat the fuel generating fluid. A heated fuel generating fluid may assist the reaction, for producing hydrogen for example. In particular, the heaters may be configured to rupture the discrete chambers and vaporise the fuel generating fluid therein.

The fuel supply apparatus may include a flow control device to control the rate at which the fuel generating fluid is introduced to the reaction chamber. The flow control device may comprise an absorbent layer between the discrete chambers and the reaction chamber for controlling the rate at which the fuel generating fluid reaches the fuel source. Each heater may have two terminals, a common terminal and an individual terminal, wherein each of the common terminals are connected to a common shared conductor, the heaters configured such that a heater can be activated by supplying power between the shared conductor and its individual terminal.

The fuel generating fluid chambers and associated heaters may be arranged in a grid, the grid comprising rows and columns, and including a shared conductor for each row and a shared conductor for each column, the heaters connected to the shared conductor for the row in which they are positioned and connected to the shared conductor for the column in which they are positioned, the grid configured such that a particular heater can be activated by supplying power between the shared conductors for its row and column.

The fuel supply apparatus may include a fuel generating fluid chamber pressurisation assembly for applying pressure to the fuel generating fluid in the chambers. The pressurisation assembly may comprise a bias member to physically press against the chambers, a mount to stretch a film sheet in which the chambers are formed, or the chambers themselves may be filled such that the fluid pressure elastically stretches a film sheet in which the chambers are formed. Applying pressure to each chamber is advantageous as it aids the efficient ejection of the fuel generating fluid from the chamber once it is ruptured.

The fluid supply apparatus may include a controller configured to monitor the demand for fuel and, in response to the monitored demand, rupture at least one fuel generating fluid chamber.

The fuel supply apparatus may be a hydrogen fuel supply apparatus. The fuel generating fluid may be water or an aqueous solution. The reaction chamber may include the fuel generating substance. The fuel generating substance may comprise a stabilized alkali metal material. The fuel generating substance may be solid, powdered, granulated or other dry form.

According to a further aspect of the invention, we provide a fluid store for use with the fuel supply apparatus of the first aspect of the invention, the fluid store comprising a plurality of discrete fuel generating fluid chambers, each fuel generating fluid chamber containing fuel generating fluid and being separately rupturable.

The discrete fuel generating fluid chambers may comprise a plurality of sealed bladders formed on a sheet, each bladder containing a fuel generating fluid, such as an activation fluid, and being separately rupturable. In particular, the sheet may be of at least two film layers, the layers sealed together at localised portions to define the plurality of bladders. This is advantageous as the flexible sheet can be arranged in various configurations to fit within a fuel supply apparatus.

The fluid store may include a heater assembly comprising a plurality of heaters, each fuel generating fluid chamber associated with at least one heater.

The heater assembly may be printed onto the film sheet.

The heater assembly may include power receiving terminals for electrically connecting to a fuel supply apparatus for receiving power therefrom.

The heaters may also be configured to heat the fuel generating fluid. In particular, the heaters may be configured to rupture the chambers and vaporise the fluid therein.

According to a further aspect of the invention, there is provided a method of supplying a fuel for use in a fuel cell, the method including the steps of;
 providing a plurality of discrete fuel generating fluid chambers, each fluid chamber containing fuel generating fluid and being separately rupturable;
 providing a fuel generating substance which, in combination with the fuel generating fluid can generate a fuel; and
 rupturing at least one fuel generating fluid chamber to transfer the fuel generating fluid to the fuel generating substance for generating the fuel.

A description is now given, by way of example only, with reference to the accompanying drawings, in which:

FIG. 4 illustrates a further embodiment of an array of fuel generating fluid chambers;

FIG. 5 illustrates a still further embodiment of an array of fuel generating fluid chambers; and FIG. 6 illustrates an exemplary embodiment of the method of the invention.

Figure 1:
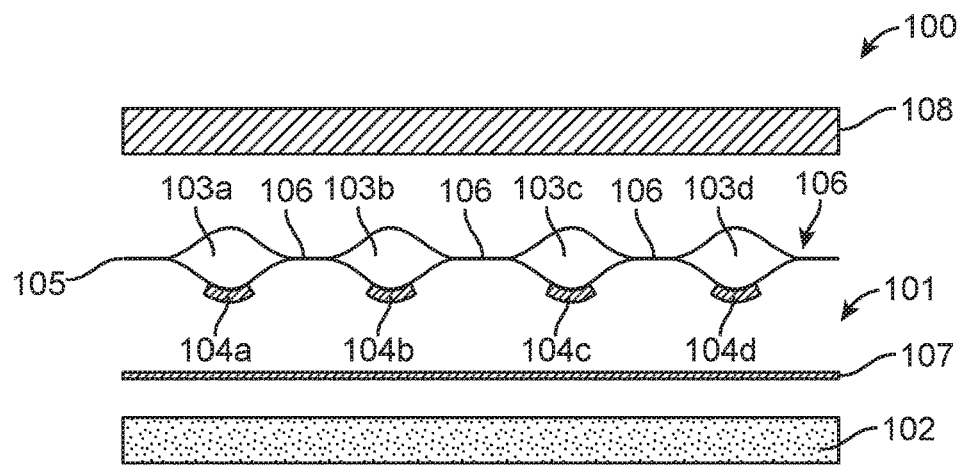
FIG. 1 shows a diagrammatic view of an exemplary embodiment of a fuel supply apparatus of the invention.
Figure 7A:
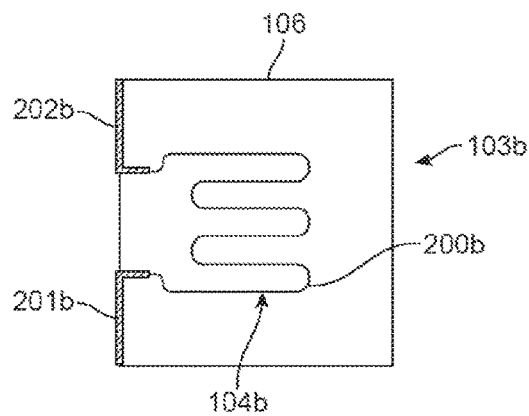
Figure 7B:
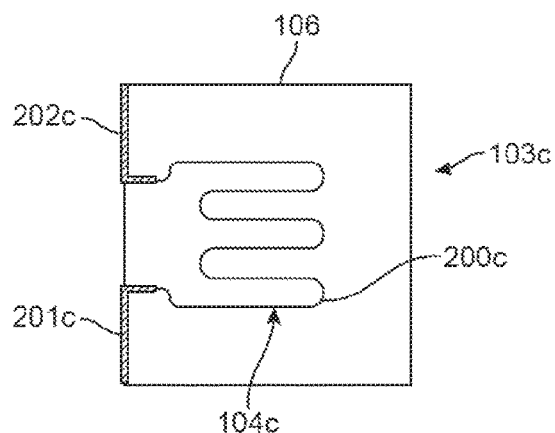
Figure 7C:
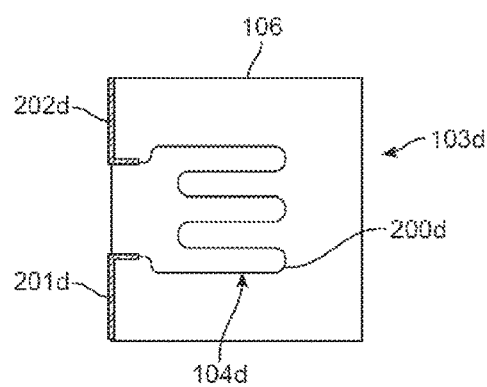

FIGS. 7A, 7B, and 7C show exemplary embodiments of three fuel generating fluid chambers shown in FIG. 1.

A diagrammatic view of an embodiment of a section of a fuel supply apparatus 100 is shown in FIG. 1. The apparatus of this exemplary embodiment uses the reaction between a fuel generating fluid (an activation fluid) and a fuel generating substance (a fuel source). The apparatus 100 includes a reaction chamber 101 containing the fuel source 102, which can be activated with an activation fluid to generate fuel. In this embodiment, the fuel source 102 comprises sodium borohydride, although any other fuel source 102 (hydrogen generating or otherwise) could be used. The apparatus 100 further comprises a plurality of discrete fuel generating fluid chambers 103a-d each containing activation fluid and therefore referred to hereafter as activation fluid chambers. In this embodiment, the activation fluid is water, although it could be any other suitable fluid. A heater assembly comprising a plurality of heaters 104a-d is provided. The heaters 104a-d can be selectively activated to rupture the activation fluid chamber 103a-d with which they are associated. Once ruptured, the activation fluid can flow from its chamber to react with the fuel source 102. Thus, in this example, the aqueous activation fluid will react with the sodium borohydride and generate hydrogen for fuelling an electrochemical fuel cell.

In this embodiment, each activation fluid chamber 103a-d is associated with one heater 104a-d. The activation fluid chambers are formed in a film sheet 105 comprising two film layers, such as a double skinned polyester film. The layers are sealed together at localised regions 106 to define the activation fluid chambers 103a-d. The chambers 103a-d thus take the form of bladders or pockets in the film sheet 105 that are filled with activation fluid. The bladders 103a-d may be arranged side by side with borders of sealed film around them, as shown in FIG. 1, or they may be directly adjacent one another without borders and an internal separating wall or a narrow sealed strip to separate the discrete chambers. The chambers may be arranged in repeated geometric pattern such as a grid, or randomly over the sheet or any other arrangement. Further, the sheet 105 may be arranged in a substantially flat configuration, or it may be folded, multiple folded or rolled or arranged in any suitable shape. Several sheets 105 may be provided.

The fuel source 102 may be arranged in a strip or over an area that may correspond to the arrangement of the sheet 105. Alternatively, the apparatus 100 may include channels to direct the activation fluid released from the chambers 103 a-d to the reaction chamber or through the reaction chamber for reacting with the fuel source 102. In the embodiment of FIG. 1, an activation fluid flow control device 107 is shown to control the rate at which the activation fluid is introduced to the fuel source 102. This may be useful to achieve a steady release of hydrogen fuel and avoid spikes in reaction rate, fuel pressure and/or heat generation. The activation fluid flow control device 107 comprises an absorbent layer between the bladders 103 a-d and the fuel source 102. When the activation fluid is released from the bladders 103 a-d it is absorbed by the absorbent layer 107 and subsequently released into contact with the fuel source 102 at a steady rate as it permeates through the layer 107. Thus, the selective rupturing of the bladders 103 a-d provides a primary means for controlling the flow of activation fluid and the activation fluid flow control device 107 provides a secondary means. The rupturing of a bladder 103 a-d releases a predetermined amount of the total activation fluid available and the activation fluid flow control device 107 controls the rate at which that predetermined amount is introduced to the fuel source 102.

Other means to control the flow of activation fluid may be used, such as flow restrictors, valves or using smaller (and perhaps more numerous) activation fluid chambers. Alternatively, an activation fluid flow control device 107 may not be provided at all.

The heaters 104a-d may be formed on the outside surface of the activation fluid chambers 103a-d. Alternatively the heaters may be formed on an internal surface or within the chambers. The heaters 104a-d include connections to receive power for activating the heaters 104a-d. The sheet 105 may include the connections at a predetermined location such that power providing terminals (not shown) in the apparatus 100 can contact when assembled. Arrangements of the connections are discussed in more detail below.

The heaters may be printed or affixed to an inner surface of a layer of the bladder 103a-d, in contact with the activation fluid, or printed or affixed to an outer surface of a layer of the bladder. The heater may extend into the bladders 103a-d. Further, the heater may be formed on part of the apparatus and the chambers 103a-d may be arranged such that they are mounted against an associated heater.

The activation fluid in the bladders 103a-d may be stored therein under pressure exerted by the resilience of the sheet 105. Thus, when the associated heater 104a-d melts through the bladder, the activation fluid is forcefully ejected from the ruptured bladder 103a-d. Alternatively or in addition, a chamber pressurisation assembly may be used to urge the activation fluid to leave the activation fluid chamber 103a-d when it is punctured.

In this embodiment, the chamber pressurisation assembly 108 comprises a foam layer arranged to contact and exert a physical pressure on the chambers 103a-d (the layer 108 is shown spaced from the chambers 103a-d in FIG. 1 for clarity). Alternatively, the chamber pressurisation assembly 108 may comprise a plurality of surfaces that sandwich the chambers 103a-d. The surfaces may be resilient or rigid and may comprise surfaces (or in part comprise surfaces) of the apparatus 100 or reaction chamber 101. The chamber pressurisation assembly 108 may alternatively comprise means to stretch the sheet 105, such as mounts or clamps that retain the sheet 105 under tension.

Figure 2:
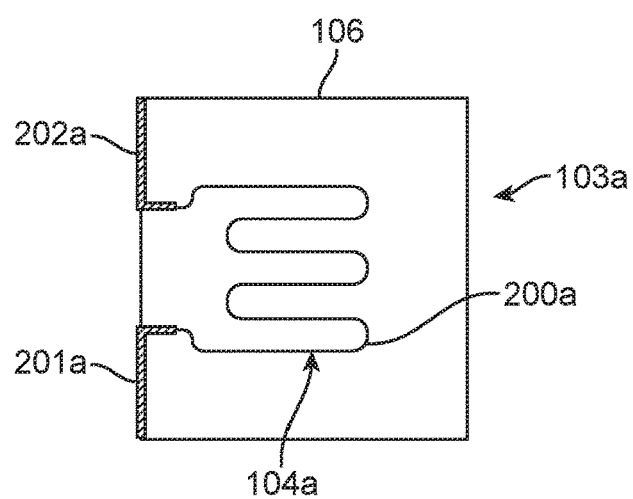
FIG. 2 shows one of the fuel generating fluid chambers shown in FIG. 1.

FIG. 2 shows a plan view of an embodiment of one of the activation fluid chambers 103 a. It will be appreciated that all or some of the activation fluid chambers 103 a-d may have the same configuration. FIGS. 7A, 7B, and 7C show plan views of embodiments of three of the activation fluid chambers 103 b-d. As shown in FIG. 2, the activation fluid chamber 103 a contains activation fluid and includes a heater 104 a printed onto an external surface of one of the layers of the film sheet 105. The heater 104 a comprises a resistive heater element 200 a and two connections 201 a, 202 a for receiving electrical power to cause the heating of the heater element 200 a. The heater element 200 a comprises a serpentine resistive track in this embodiment, although the heater element 200 a could take other forms. The heater element 200 a may be configured to act over a small point of the chamber 103 a or over its entire surface or an area in between. It may be arranged to locally heat the film sheet to melt a hole in it to release the activation fluid. Alternatively, it may be arranged to heat the activation fluid so that the internal pressure in the chamber 103 a causes it to rupture and release the activation fluid. It will be appreciated that the arrangement of the heater element 200 a will affect how the activation fluid is released, i.e. the release rate and state of the activation fluid, which can be selected to suit the intended use of the apparatus 100. Thus, the heater may be arranged to heat (possibly above 100° C.) the activation fluid sufficiently to partially or completely vaporise it such that it flows to the reaction chamber 101 as a vapour or gas.

The connections 201a, 202a may be connected to terminals in the apparatus which apply an electric current to the connections to heat the heater and rupture the chamber 103a. The electric current may be applied as a pulse. The profile of the pulse affects the size of the hole melted into the sheet 105. A short pulse creates a smaller hole while a longer pulse creates a larger hole. The size of the hole will affect the rate at which the activation fluid leaves the chamber 103a.

Figure 3:
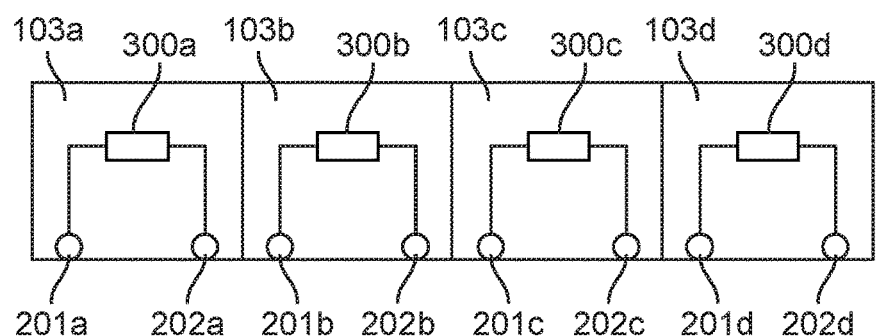
FIG. 3 illustrates an embodiment of an array of fuel generating fluid chambers.

FIG. 3 shows an exemplary arrangement of four activation fluid chambers 103a-d side by side in a strip. The heater elements 300a-d are represented as a box. Each heater element includes a pair of connections 201a-d, 202a-d which may each connect to corresponding terminals in the apparatus 100. A controller (not shown) associated with the apparatus can therefore selectively apply power to the terminals to activate one or more of the heaters elements 300a-d and thus selectively rupture each of the chambers 103a-d.

FIG. 4 shows an exemplary arrangement of four activation fluid chambers 403a-d side by side in a strip. In this embodiment, the connections are arranged differently. Each heater includes a common terminal connection 401a-d and an individual terminal connection 402a-d. The arrangement includes a shared connection 410, which is connected to the common terminal connections 401a-d of each heater element 400a-d. The shared connection terminates at point 411, which in this embodiment is located on the first chamber 403a in the strip. The individual connections 402a-d of each of the heater elements 400a-b is present on each of the chambers 103a-d. Thus, to rupture each of the chambers 403a-d, the controller applies power across the shared connection 410 and one or more of the second individual connections 402a-d depending on which of the chambers 403a-d it is rupturing.

FIG. 5 shows an exemplary arrangement of nine activation fluid chambers 503a-i each with an associated heater 500a-i in a grid. The connection arrangement comprises a shared connection 520, 521, 522 for each of the rows 523, 524, 525 of chambers and heaters. The connection arrangement further comprises a shared connection 530, 531, 532 for each of the columns 533, 534, 535 of chambers and heaters. The shared connections terminate at points 526, 527, 528 and 536, 537, 538 for connection to terminals of the apparatus 100. Each heater element has two connections, one of which is connected to the shared connection for the row it is in and the other is connected to the shared connection for the column it is in. Thus, heater element 500a is connected to shared connections 520 and 530. Heater element 500b is connected to shared connections 520 and 531, and so on, to heater element 500i, which is connected between shared connections 522 and 532. Thus, to rupture a particular chamber 503a-d, the controller applies power to the termination points of the shared connections that correspond to the row and column in which the heater element is located. Thus, to rupture chamber 503e, which lies in the second row and the second column, the controller applies power between the second row shared connection 521 and the second column shared connection 531.

In use, the apparatus 100 includes the fuel source 102 and activation fluid contained within the chambers 103a-d, 403a-d, 503a-d. The apparatus 100 is connected to a fuel cell, which requires a supply of hydrogen fuel from the apparatus 100. As hydrogen is required, which may be detected by maintaining a pressure within the apparatus (which will fall as hydrogen is drawn off by the fuel cell), the controller may selectively rupture the chambers 103a-d, 403a-d, 503a-d to release a quantity of activation fluid for reacting with the fuel source 102. In the present embodiment, the heater elements 200a-d, 300a-d, 400a-d, 500a-i are activated sequentially as hydrogen is required. Thus, a pulse of power is applied, in turn, to each chamber to melt a hole in its surface and release the activation fluid therein. In other embodiments, several chambers may be ruptured simultaneously depending on the demand for fuel. In the embodiment of FIG. 1, the activation fluid is received by the activation fluid flow control device 107, which absorbs the activation fluid and releases it at a slower rate to which it was received from the ruptured chamber 103a-d. The activation fluid can then react with the fuel source 102, or be channeled to the reaction chamber 101 to react with the fuel source 102 and generate the hydrogen fuel.

In a further embodiment, the controller is configured to apply sufficient energy to the heaters to rupture the chamber and vaporise the activation fluid therein. The activation fluid thus travels to the fuel source 102 and reacts therewith as a vapour or gas. This may make the reaction more efficient. Further, the power level supplied to the heater may be controlled to effect heating of the activation fluid and then rupturing of the chamber. For example, a first power level may be applied to heat the activation fluid followed by a higher power level (which may be a spike in power) which ruptures the chamber.

The arrangement of activation fluid in discrete, separately rupturable chambers is advantageous as it allows the controller to control the amount of activation fluid that is released by rupturing only the relevant number of chambers.

The bladders may be formed of multiple layers of film, which may encapsulate the fuel generating substance between certain layers and the heaters and connections between other layers. The conductors for the heaters may be arranged to extend in the borders between the bladders. The heaters may act on a single point on the bladder or multiple points, which can be used to control the rate of release of fuel generating fluid. The heaters may be destroyed on actuation and rupture of the bladder or they may be reusable. The size and number of the bladders can be used to control the rate of fuel generation and thus suit the power requirements of a particular application.

In a further embodiment (not shown), the fuel generating fluid comprises a fuel source fluid, such as sodium borohydride solution. The fuel generating substance, which may be located within the reaction chamber, comprises a catalyst, such as ruthenium, rhodium, nickel or platinum. Thus, in this embodiment, rather than a reaction between the fuel generating fluid and the fuel generating substance, the fuel generating substance catalyses the generation of fuel from the fuel generating fluid. Accordingly, in use, the sodium borohydride solution is released from the fuel generating fluid chambers and meets the catalyst in the reaction chambers, which catalyses the generation of hydrogen fuel from the sodium borohydride solution. It will be appreciated that other fuel generating fluids in combination with other catalysts may be used.

FIG. 6 shows a flow chart illustrating an exemplary embodiment of the invention. Step 601 illustrates providing a plurality of discrete fuel generating fluid chambers, each fluid chamber containing fuel generating fluid and being separately rupturable. Step 602 illustrates providing a fuel generating substance which can generate fuel in combination with the fuel generation fluid. Step 603 illustrates rupturing at least one fuel generating fluid chamber to transfer the fluid to the fuel generating substance for generating the fuel.

It will be appreciated that features described in regard to one example may be combined with features described with regard to another example, unless an intention to the contrary is apparent.

The invention claimed is:

1. A fuel supply apparatus comprising;
   (a) a reaction chamber;
   (b) an optional permeable absorbent layer having opposing first and second sides, such that when present, the first side of the permeable absorbent layer is adjacent to the reaction chamber; and
   (c) a plurality of sealed bladders formed in a film sheet comprising two film layers, wherein the two film layers are sealed together at localized regions and each sealed bladder:
      (i) is a fuel generating fuel chamber optionally containing a fuel generating fluid;
      (ii) is surrounded by a border of sealed film; and
      (iii) is positioned adjacent to the reaction chamber, or where the optional permeable absorbent layer is present, each of the plurality of sealed bladders is positioned adjacent to the second side of the permeable absorbent layer, and
   (d) a heater assembly comprising a plurality of heaters capable of independently addressing and rupturing each of the sealed bladders,
   such that when any one of the plurality of sealed bladders is ruptured by the heater assembly, the ruptured bladder is in fluid communication with the reaction chamber.

2. The fuel supply apparatus of claim 1, wherein the heater assembly is printed or affixed to an inner surface or an outer surface of each of the bladders.

3. The fuel supply apparatus of claim 1, wherein each of the plurality of heaters has a common terminal and an individual terminal, each of the common terminals being connected to a common shared conductor, wherein each one of the plurality of heaters is configured to be activated by supplying power between the shared conductor and the individual terminal of the heater.

4. The fuel supply apparatus of claim 1, wherein the fuel generating fluid chambers and associated heaters are arranged in a grid, the grid comprising rows and columns, and including a shared conductor for each row and a shared conductor for each column, each heater connected to the shared conductor for the row in which the heater is positioned and connected to the shared conductor for the column in which the heater is positioned, the grid configured such that each heater can be activated by supplying power between the shared conductors of the row and the column in which the heater is positioned.

5. The fuel supply apparatus of claim 1, wherein the heaters are configured to vaporize the fuel generating fluid within each of the fuel generating fluid chambers.

6. The fuel supply apparatus of claim 1, wherein the optional permeable absorbent layer is present.

7. The fuel supply apparatus of claim 1, wherein the fuel supply apparatus includes a fuel generating fluid chamber pressurisation assembly for applying pressure to the fuel generating fluid in the chambers, the pressurisation assembly comprising a bias member to physically press against the chambers.

8. The fuel supply apparatus of claim 1, wherein the plurality of sealed bladders are arranged in a sheet, with each sealed bladder being positioned adjacent to another sealed bladder.

9. The fuel supply apparatus of claim 1, wherein the plurality of sealed bladders are arranged side-by-side in the sheet.

10. The fuel supply apparatus of claim 1, wherein the plurality of sealed bladders are arranged randomly in the sheet.

11. The fuel supply apparatus of claim 1, wherein the fuel generating fuel chambers are arranged in a repeated geometric pattern.

12. The fuel supply apparatus of claim 1, wherein the sheet is sufficiently flexible so as to be capable of being rolled or folded.

13. The fuel supply apparatus of claim 1, wherein the at least two layers of film comprise polyester.

14. The fuel supply apparatus of claim 1, wherein the plurality of sealed bladders are arranged in a sheet, with each sealed bladder being positioned adjacent to another scaled bladder, and separated by an internal separating wall or a narrow sealed strip.

15. The fuel supply apparatus of claim 14, wherein the heater assembly is printed or affixed to an inner surface or an outer surface of one of the at least two film layers.

16. The fuel supply apparatus of claim 14, wherein the fuel supply apparatus includes a fuel generating fluid chamber pressurisation assembly for applying pressure to the fuel generating fluid in the chambers, the pressurisation assembly comprising a mount to stretch the sheet in which the chambers are formed.

17. The fuel supply apparatus of claim 1, wherein each of the sealed bladders contains the fuel generating fluid, and the reaction chamber contains a fuel generating substance, the reaction chamber being capable of hosting a reaction to generate fuel when the fuel generating fluid and the fuel generating substance are brought together.

18. The fuel supply apparatus of claim 17, wherein the heater assembly is configured to heat the fuel generating fluid as well as rupture the sealed bladders.

19. The fuel supply apparatus of claim 17, wherein the optional permeable absorbent layer is present, and wherein the permeable absorbent layer acts as a fluid flow control device between the fuel generating fluid chambers and the reaction chamber, when at least of the sealed bladders is ruptured.

20. The fuel supply apparatus of claim 17, wherein each of the sealed bladders is filled with the fuel generating fluid, the fuel generating fluid exerting a pressure so as to elastically stretch the film sheet in which the fuel generating fuel chambers are formed.

21. The fuel supply apparatus of claim 17, wherein the fuel generating fluid is water or an aqueous solution.

22. The fuel supply apparatus of claim 17, wherein the fuel generating substance comprises sodium borohydride, optionally in the presence of a ruthenium, rhodium, nickel or platinum catalyst.

23. A method of supplying a fuel for use in a fuel cell, from the fuel supply apparatus of claim 17, the method comprising rupturing at least one of the plurality of sealed bladders to transfer the fuel generating fluid to the fuel generating substance for generating the fuel.

* * * * *